United States Patent Office 3,322,844
Patented May 30, 1967

3,322,844
PROCESS FOR PURIFYING A NORMAL ALPHA OLEFIN
William H. Clement, Cincinnati, Ohio, Howard M. Peters, Palo Alto, Calif., and Charles M. Selwitz, Pitcairn, Pa., assignors to Gulf Research & Development Company, Pittsburgh, Pa., a corporation of Delaware
No Drawing. Filed May 20, 1964, Ser. No. 368,986
21 Claims. (Cl. 260—677)

This invention relates to a process for purifying a normal alpha olefin.

Ethylene can be polymerized in the presence of a trialkyl aluminum, such as triethyl aluminum, at a temperature of about 140° to about 325° C. and a pressure of about 1000 pounds per square inch gauge to as high as about 1000 atmospheres, or even higher, for about five to about 120 minutes to obtain a mixture containing about 85 to about 95 mol percent of normal alpha olefins, about one to about 10 mol percent of internal straight chain normal olefins, about one to about 10 mol percent of trisubstituted monoolefins, that is, compounds of the structural formula $R_2C=CHR$, wherein R is an alkyl group, and about one to about 10 mol percent of vinylidenes, that is compounds of the structural formula $R_2C=CH_2$, wherein R is an alkyl group. The olefins so obtained will have predominantly from two to twenty carbon atoms, although lesser amounts of olefins having from 22 to 60 carbon atoms will also be produced.

The mixture defined above can be treated, for example, by distillation, to recover individual normal alpha olefins or fractions containing several individual normal alpha olefins. Unfortunately the other olefins defined above will remain in association with the individual normal alpha olefins or fractions containing the several individual normal alpha olefins. A particularly attractive fraction obtained from the olefin mixture defined above is one containing $C_{12}$, $C_{14}$ and $C_{16}$ normal alpha olefins which can be employed in a reaction with benzene to form a straight chain alkyl benzene which can then be sulfonated, or otherwise treated, to form a highly biodegradable detergent. In such cases in particular, and others as well, the vinylidenes and trisubstituted contaminants are not desirable, since they will react with benzene to form branch chain alkyl benzenes which when sulfonated will form detergents which are not highly biodegradable. By following the procedure defined and claimed herein the total amount of such contaminants associated with the normal alpha olefins is appreciably reduced.

We have discovered that a normal alpha olefin or mixtures of normal alpha olefins admixed with trisubstituted monoolefins and/or vinylidenes of the type defined above can be treated with sulfuric acid alone or sulfuric acid in the presence of a non-polar hydrocarbon in order to reduce the content of said trisubstituted monoolefins and/or vinylidenes. As a result of such treatment we believe a small amount of the normal alpha olefins are isomerized to trans and/or cis internal straight chain olefins, some vinylidenes are isomerized to trisubstituted monoolefins and trisubstituted monoolefins and vinylidenes are converted to species soluble in the aqueous acid phase. In any event the mol percent of the desired normal alpha olefins in the final product will be increased as a result of such treatment, and while in general the mol percent of the trisubstituted monoolefins may be increased slightly, the total mol percent of the undesired trisubstituted monoolefins and vinylidenes will be substantially reduced.

The procedure of this invention resides in contacting a mixture containing at least one normal alpha olefin and at least one trisubstituted olefin and/or at least one vinylidene under selected reaction conditions with aqueous sulfuric acid having a concentration of about 80 to about 88 percent, preferably about 86 percent, alone, or, preferably, in combination with a nonpolar hydrocarbon or a non-polar halogenated hydrocarbon. While the reaction conditions are not critical, they must be closely followed in order to obtain the beneficial results of this invention. Thus, the temperature required can be from about —10° C. to about 50° C., preferably about 0° C. to about 30° C. Pressure will have little effect on the course of the reaction. In any event a pressure of about one to about 1000 pounds per square inch absolute, preferably about 10 to about 100 pounds per square inch absolute is satisfactory. The mixture to be treated and the sulfuric acid and hydrocarbon, when used, are maintained in intimate contact with each other for a period which can be, for example, from about 0.1 to about 1000 minutes, preferably from about one to about 100 minutes. The amount of sulfuric acid must be at least sufficient to react with the vinylidenes and trisubstituted olefins present in the charge, to serve as a catalyst medium therefor and/or form a medium wherein such reaction products and/or polymers can dissolve. In general about 1/10 to about 20 volumes, preferably about 0.2 to about four volumes, based on the normal alpha olefin mixture being treated is sufficient for the defined purposes. The non-polar organic solvent employed on a volume basis can fall within the amounts defined above for the sulfuric acid. Amounts in excess of the amounts defined can be employed, if desired, but for economic reasons are not preferred.

Upon completion of the reaction the treated mixture resolves itself into a lower aqueous sulfuric acid layer and an upper organic layer. The two layers are separated from each other in any convenient manner, for example, by withdrawal of the lower aqueous sulfuric acid layer by means of a separatory funnel. The organic phase is then preferably washed with water or any material that will extract residual acidic components therefrom, such as an aqueous solution of sodium hydroxide, a water and methanol mixture, aqueous ammonium hydroxide, an aqueous solution of sodium chloride, etc., until the product is essentially neutral. If a hydrocarbon has also been employed it is separated from the organic product by any convenient means, for example, by distillation at a temperature of about 0° to about 150° C. and a pressure of about one to about 20 pounds per square inch absolute. If desired, the normal alpha olefin mixture left behind, containing a higher mol percent of normal alpha olefins and less total mols of vinylidenes and trisubstituted olefins, can be subjected to further distillation to leave behind any heavier material that may be present.

As noted the aqueous sulfuric acid employed herein must have a concentration of about 80 to 88 percent. If the concentration of the sulfuric acid is below about 80 percent little or no removal of the trisubstituted monoolefins and vinylidenes occurs. When the concentration of the sulfuric acid employed is above about 88 percent, the molar percent of the desirable normal alpha olefins in the treated mixture will be appreciably reduced and the tolar molar amount of trans and cis internal straight chain olefins will be substantially increased.

While we are not certain we are of the belief that the presence of a non-polar solvent enhances the defined purification procedure for the following reason. Under the conditions of the reaction the vinylidene species most readily forms a carbonium ion which is paired with the hydrogen sulfonate ion as follows:

(1)
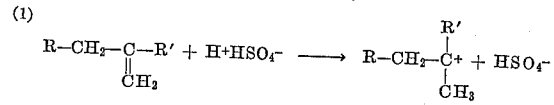

This ionic species is in equilibrium between the olefinic phase and the aqueous phase. In the olefinic phase the loss of a proton to form an olefin is favored:

(2) 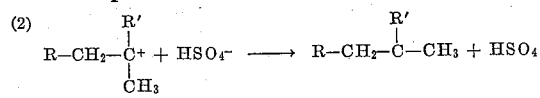

In the aqueous phase the formation of the sulfonic acid is favored:

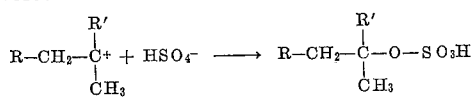

A material which aids in making the olefinic phase less polar will decrease the solubility of the ionic species in such phase and increase it in the aqueous phase. This will thus favor the removal reaction over the isomerization to tribranched olefins. Accordingly, non-polar acyclic paraffins having from three to eight carbon atoms and higher, such as propane, butane, 2-methylbutane, pentane, heptane, etc., cyclic paraffins having from three to eight carbon atoms and higher, such as cyclohexane, methylcyclopentane, etc., and chlorinated paraffins, having from one to eight carbon atoms and higher, such as carbon tetrachloride, normal butyl chloride, cyclohexyl chloride, methyl bromide, etc., can thus be used.

The invention can further be illustrated by the following. Several runs were made wherein to 50 grams of a $C_{12}$ normal alpha olefin mixture or to 50 grams of a $C_{12}$ normal alpha olefin mixture dissolved in 50 milliliters of normal pentane there was added 50 grams of aqueous sulfuric acid with stirring at atmospheric pressure. The reaction mixture was stirred during the reaction period, and at the end thereof the two layers that formed were permitted to separate. The lower aqueous layer was removed by means of a separatory funnel, and the organic phase remaining was extracted first with dilute aqueous sodium hydroxide solution and then twice with water. The organic layer resulting was analyzed by infrared. The results obtained are tabulated below in Table I.

additional increase in molar concentration of normal alpha olefins in the treated product and further reduction in the molar concentration of vinylidene.

Obviously, many modifications and variations of the invention, as hereinabove set forth, can be made without departing from the spirit and scope thereof, and therefore only such limitations should be imposed as are indicated in the appended claims.

We claim:
1. A process for treating a mixture of normally liquid olefins containing predominantly at least one normal alpha olefin and lesser amounts of at least one substituted olefin selected from the group consisting of trisubstituted monoolefins and vinylidenes which comprises contacting said mixture with sulfuric acid having a concentration of about 80 to about 88 percent, separating the resulting olefinic mixture from said sulfuric acid, said resulting olefinic mixture containing substantially all of said normal alpha olefin and a reduced content of said substituted olefin.

2. A process for treating a mixture of normally liquid olefins containing predominantly at least one normal alpha olefin and lesser amounts of at least one substituted olefin selected from the group consisting of trisubstituted monoolefins and vinylidenes which comprises contacting said mixture with about 1/10 to about 20 volumes of sulfuric acid having a concentration of about 80 to about 88 percent, separating the resulting olefinic mixture from said sulfuric acid, said resulting olefinic mixture containing substantially all of said normal alpha olefin and a reduced content of said substituted olefin.

3. A process for treating a mixture of normally liquid olefins containing predominantly at least one normal alpha olefin and lesser amounts of at least one substituted olefin selected from the group consisting of trisubstituted monoolefins and vinylidenes which comprises contacting said mixture with about 1/10 to about 20 volumes of sulfuric acid having a concentration of about 80 to about 88 percent at a temperature of about $-10°$ to about 50° C., separating the resulting olefinic mixture from said

TABLE I

| | Charge | Run No. | | | | | | |
|---|---|---|---|---|---|---|---|---|
| | | 1 | 2 | 3 | 4 | 5 | 6 | 7 |
| H₂SO₄, percent concentration | | 86 | 86 | 86 | 90 | 86 | 86 | 86 |
| Pentane, ml | | | | | | | 50 | 50 |
| Time, minutes | | 15 | 15 | 10 | 10 | 30 | 30 | 30 |
| Temperature, °C | | 10-15 | 2-5 | 2-4 | 2-4 | 10-15 | 10-15 | 10-15 |
| Olefin isomer distribution, mol percent: | | | | | | | | |
| RCH=CH₂ | 91.6 | 93.6 | 92.9 | 93.6 | 89.2 | 94.4 | 95.8 | 95.4 |
| RCH=CHR (cis and trans) | 1.5 | 1.7 | 2.2 | 1.9 | 8.4 | 1.8 | 1.3 | 1.3 |
| R₂C=CH₂ | 5.6 | 1.0 | 1.3 | 1.1 | 0.7 | 0.7 | 0 | 0.6 |
| R₂C=CHR | 1.4 | 3.7 | 3.7 | 3.3 | 1.7 | 3.0 | 2.9 | 2.8 |

The results obtained by following the procedure of the invention defined and claimed herein are apparent from an examination of the data in Table I. Note that in each of Runs Nos. 1, 2, 3 and 5, wherein the sulfuric acid employed had a concentration of 86 percent the mol percent of normal alpha olefin in the treated product was increased over that in the charge, the vinylidene content went down and, while the mol percent of trisubstituted olefins increased somewhat, the total mol percent of vinylidene and trisubstituted olefins in the treated product was substantially reduced. However, as Run No. 4 well shows, the use of sulfuric acid of 90 percent concentration results in the reduction in the mol percent of vinylidene and trisubstituted olefins but at the expense of increasing the molar percent of cis and trans internal olefins and appreciably decreasing the molar concentration of the desirable normal alpha olefins. The use of pentane in combination with sulfuric acid in Runs 6 and 7 results in an sulfuric acid, said resulting olefinic mixture containing substantially all of said normal alpha olefin and a reduced content of said substituted olefin.

4. A process according to claim 1 wherein the olefins in said mixture have from 12 to 16 carbon atoms per molecule.

5. A process according to claim 4 wherein said olefins have 12 carbon atoms per molecule.

6. A process according to claim 2 wherein the olefins in said mixture have from 12 to 16 carbon atoms per molecule.

7. A process according to claim 3 wherein the olefins in said mixture have from 12 to 16 carbon atoms per molecule.

8. A process according to claim 6 wherein the temperature is between about 0° to about 30° C., the sulfuric acid has a concentration of about 86 percent and the contact time is about 0.1 to about 30 minutes.

9. A process for treating a mixture of a non-polar solvent and an olefin fraction containing normally liquid olefins, said olefin fraction containing predominantly at least one normal alpha olefin and lesser amounts of at least one substituted olefin selected from the group consisting of trisubstituted monoolefins and vinylidenes which comprises contacting said mixture with sulfuric acid having a concentration of about 80 to about 88 percent, separating the resulting olefinic mixture from said sulfuric acid, said resulting olefinic mixture containing substantially all of said normal alpha olefin and a reduced content of said substituted olefin.

10. A process according to claim 9 wherein the amount of said sulfuric acid and the amount of said non-polar solvent are each between about 1/10 to about 20 volumes per volume of said olefin fraction.

11. A process according to claim 10 wherein said contacting occurs at a temperature of about −10° to about 50° C.

12. A process according to claim 9 wherein the olefins in said mixture have from 12 to 16 carbon atoms per molecule.

13. A process according to claim 12 wherein the olefins have 12 carbon atoms per molecule.

14. A process according to claim 10 wherein the olefins have from 12 to 16 carbon atoms per molecule.

15. A process according to claim 11 wherein the olefins have from 12 to 16 carbon atoms per molecule.

16. A process according to claim 15 wherein said sulfuric acid has a concentration of about 86 percent.

17. A process according to claim 9 wherein the non-polar solvent is an acyclic paraffin having from 3 to 8 carbon atoms.

18. A process according to claim 17 wherein the non-polar solvent is pentane.

19. A process according to claim 11 wherein the non-polar solvent is pentane.

20. A process according to claim 16 wherein the non-polar solvent is pentane.

21. A process according to claim 20 wherein said olefins in said olefin fraction have 12 carbon atoms per molecule.

References Cited
UNITED STATES PATENTS

| | | | |
|---|---|---|---|
| 2,090,905 | 8/1939 | Stevens et al. | 260—683.15 |
| 2,205,159 | 6/1940 | Stevens et al. | 260—683.15 |
| 2,446,947 | 8/1948 | Munday et al. | 260—683.15 |
| 2,670,392 | 2/1954 | Glassmire et al. | 260—683.15 |

DELBERT E. GANTZ, *Primary Examiner.*

ALPHONSO D. SULLIVAN, *Examiner.*